US011499088B2

(12) United States Patent
Aman et al.

(10) Patent No.: US 11,499,088 B2
(45) Date of Patent: Nov. 15, 2022

(54) BORONIC HYDRATE INHIBITORS

(71) Applicant: SHELL OIL COMPANY, Houston, TX (US)

(72) Inventors: Zachary Mark Aman, Perth (AU); Eric Freemantle May, Perth (AU); Martin John Fernie, Perth (AU); Gritienus Haandrikman, Amsterdam (NL); Shane Andrew Morrissy, Perth (AU); Daniel Lee Crosby, Houston, TX (US)

(73) Assignee: SHELL USA, INC., Houston, TX (US)

( * ) Notice: Subject to any disclaimer, the term of this patent is extended or adjusted under 35 U.S.C. 154(b) by 0 days.

(21) Appl. No.: 16/638,859

(22) PCT Filed: Aug. 9, 2018

(86) PCT No.: PCT/US2018/046032
§ 371 (c)(1),
(2) Date: Feb. 13, 2020

(87) PCT Pub. No.: WO2019/036278
PCT Pub. Date: Feb. 21, 2019

(65) Prior Publication Data
US 2020/0362225 A1 Nov. 19, 2020

Related U.S. Application Data

(60) Provisional application No. 62/545,176, filed on Aug. 14, 2017.

(51) Int. Cl.
C09K 8/524 (2006.01)
C07F 5/02 (2006.01)

(52) U.S. Cl.
CPC .............. C09K 8/524 (2013.01); C07F 5/025 (2013.01); C09K 2208/22 (2013.01)

(58) Field of Classification Search
None
See application file for complete search history.

(56) References Cited

U.S. PATENT DOCUMENTS

| 5,076,364 | A | 12/1991 | Hale et al. |
| 5,460,728 | A | 10/1995 | Klomp et al. |
| 5,648,575 | A | 7/1997 | Klomp et al. |
| 5,841,010 | A | 11/1998 | Rabeony et al. |
| 5,879,561 | A | 3/1999 | Klomp et al. |
| 6,905,605 | B2 | 6/2005 | Klomp et al. |
| 7,696,393 | B2 | 4/2010 | Rivers et al. |
| 8,778,052 | B2 | 7/2014 | Dam et al. |
| 8,814,473 | B2 | 8/2014 | Hatton et al. |
| 9,732,265 | B2 * | 8/2017 | Chung ..................... C09K 8/68 |
| 9,890,323 | B2 * | 2/2018 | Holtsclaw .............. C09K 8/685 |
| 10,196,406 | B2 * | 2/2019 | Nonnenmacher ......... C07F 5/04 |
| 10,240,083 | B2 * | 3/2019 | Tustin .................... C09K 8/512 |
| 2006/0009363 | A1 * | 1/2006 | Crews .................... C09K 8/685 507/100 |
| 2013/0178399 | A1 * | 7/2013 | Falana ..................... C09K 8/52 507/141 |
| 2014/0249053 | A1 * | 9/2014 | Robinson ............. G01N 21/643 506/9 |
| 2015/0075789 | A1 * | 3/2015 | Singh ..................... E21B 43/26 166/308.1 |
| 2015/0101815 | A1 * | 4/2015 | Soane ................. E21B 43/2406 166/303 |
| 2016/0363693 | A1 * | 12/2016 | Murugesan ............. G01V 8/16 |

FOREIGN PATENT DOCUMENTS

JP 2011184365 A 9/2011

OTHER PUBLICATIONS

Tariq et al. Gas Hydrate Inhibition: A Review of the Role of Ionic Liquids, 2014, I&EC research, p. 17855-17868 (Year: 2014).*
Boukherissa et al. Ionic Liquids as Dispersants of Petroleum Asphaltenes, 2009, Energy & Fuels, 23, 2557-2564 (Year: 2009).*
International Search Report and Written Opinion received for PCT Patent Application No. PCT/US2018/046032, dated Oct. 23, 2018, 12 pages.
Yabroff et al.,"The Relative Strengths of Some Hydrocarbon Derivatives of Boric Acid", Journal of the American Chemical Society, vol. 56, Issue No. 9, Sep. 1, 1934, pp. 1850-1857, XP55514560.
Zhao et al., "Anti-Agglomeration of Natural Gas Hydrates in Liquid Condensate and Crude Oil at Constant Pressure Conditions", Fuel, vol. 180, Mar. 16, 2016, pp. 187-193, XP55514596.
Khotinsky et al., "The Effect of Organomagnesium Compounds on Boric Acid Esters", BER, vol. 42, Jan. 1, 1909, pp. 3090-3096, XP55514556.

* cited by examiner

Primary Examiner — Angela M DiTrani Leff
(74) Attorney, Agent, or Firm — Shell USA, Inc.

(57) ABSTRACT

A hydrate inhibitor comprising a boronic acid moiety and associated methods and compositions.

8 Claims, No Drawings

BORONIC HYDRATE INHIBITORS

CROSS REFERENCE TO RELATED APPLICATIONS

This is a national stage application of International application No. PCT/US2018/046032, filed 9 Aug. 2018, which claims priority of U.S. provisional application No. 62/,545,176, filed 14 Aug. 2017.

FIELD OF THE INVENTION

The present disclosure relates generally to anti-agglomerate hydrate inhibitors. More specifically, in certain embodiments, the present disclosure relates to boronic hydrate inhibitors and associated compositions and methods.

BACKGROUND OF THE INVENTION

Low-boiling hydrocarbons, such as methane, ethane, propane, butane, and iso-butane, are normally present in conduits used for the transport and processing of natural gas and crude oil. When water is also present in such conduits, the water/hydrocarbon mixture is, under conditions of low temperature and elevated pressure, capable of forming gas hydrate crystals. Gas hydrates are clathrates (inclusion compounds) in which small gas molecules are trapped in a lattice or cage consisting of water molecules.

The structure of gas hydrates depends on the type of the gas forming the structure: methane and ethane may form cubic lattices having a lattice constant of 1.2 nm (normally referred to as structure I), while propane and butane may form cubic lattices having a lattice constant of 1.73 nm (normally referred to as structure II). It is known that even the presence of a small amount of propane in a mixture of low-boiling hydrocarbons will result in the formation of structure II gas hydrates, the predominate hydrate encountered during the production of oil and gas.

Gas hydrate crystals are known to block or even damage the subsea conduits. In order to cope with this undesired phenomenon, a number of remedies have been proposed in the past such as removal of free water, maintaining elevated temperatures and/or reduced pressures or the addition of chemicals such as melting point depressants (antifreezes). Melting point depressants, typical examples of which are methanol and various glycols, often need to be added in substantial amounts in order to be effective. This is disadvantageous with respect to costs of the materials, their storage facilities and their recovery.

Another approach to keep the fluids in conduits flowing is adding nucleation and/or crystal growth inhibitors and/or compounds capable of preventing hydrate crystal agglomeration to the fluids. Compared to the amounts of antifreeze required, small amounts of such compounds are normally effective in preventing the blockage of a conduit by hydrates. The principles of interfering with crystal growth and/or agglomeration are known. These compounds are collective known as low dosage hydrate inhibitors or LDHIs.

Hydrate inhibitors are broadly divided into kinetic hydrate inhibitors, commonly abbreviated in the art as KHI's, and anti-agglomerates, commonly abbreviated in the art as AA's. Kinetic hydrate inhibitors seek to delay the nucleation and/or growth of gas hydrates in a controlled manor, while AA's are designed to create a mobile, multiphase matrix containing relatively small hydrate particles. Anti-agglomerate hydrate inhibitors allow for the formation of hydrate particles that do not adhere or agglomerate, in part or in whole, to themselves and/or other available solid surfaces.

U.S. Pat. Nos. 8,814,473, 8,778,052, 7,696,393, 5,076,364, 5,879,561, 5,460,728, 5,648,575, and 6,905,605 describe several different types of anti-agglomerate hydrate inhibitors.

It would be advantageous to develop a new class of anti-agglomerate hydrate inhibitors.

SUMMARY OF THE INVENTION

The present disclosure relates generally to anti-agglomerate hydrate inhibitors. More specifically, in certain embodiments, the present disclosure relates to boronic hydrate inhibitors and associated compositions and methods.

In one embodiment, the present disclosure provides a boronic hydrate inhibitor.

In another embodiment, the present disclosure provides a hydrate inhibitor composition comprising a boronic hydrate inhibitor and carrier fluid.

In another embodiment, the present disclosure provides a method comprising: providing a hydrate inhibitor composition comprising a boronic hydrate inhibitor and injecting the hydrate inhibitor composition into a well or pipeline.

DETAILED DESCRIPTION

The description that follows includes exemplary apparatuses, methods, techniques, and/or instruction sequences that embody techniques of the inventive subject matter. However, it is understood that the described embodiments may be practiced without these specific details.

The present disclosure relates generally to anti-agglomerate hydrate inhibitors. More specifically, the present disclosure relates to boronic hydrate inhibitors and associated compositions and methods.

One advantage of the boronic hydrate inhibitors disclosed herein is that they have been shown to have minimal interactions with water-oil interfaces that allow them to be used without enhancing the stability of emulsification. Another advantage of the boronic hydrate inhibitors discussed herein is that in certain embodiments they have shown a high hydrate-philic behavior, which allows for hydrate surface adsorption at lower concentrations than conventional hydrate inhibitors.

As used herein, the term boronic hydrate inhibitor refers to a hydrate inhibitor that comprises a boronic acid moiety. The boronic hydrate inhibitor preferably has the following chemical structure:

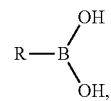

wherein R may be selected from the group consisting of an alkyl chain, an alkenyl chain, an arene group, an aryl chain, an arylalkyl chain, an arylalkenyl chain, an alkylaryl chain, an alkenylaryl chain, a polycyclic aromatic group, a cyclic group, a polycyclic group, an aromatic group, an amine, an amide, a sulfonamide, a phosphor amide, an acyl, an imide, an ethoxylated chain, a propoxylated chain, an alkylamino group, and a glycol group.

R preferably comprises 1 to 20 carbon atoms. More preferably, R comprises 6 to 10 carbon atoms. In preferred embodiments, R comprises a normal, cyclic, polycyclic, unsaturated, or branched chain. Embodiments of R comprise a chain having non-carbon atoms. For example, without limitation, R may comprise sulfur, nitrogen, and/or oxygen atoms.

In one embodiment, R comprises an alkylamino group having from 1 to 20 carbon atoms. Preferably, the alkylamino group has from 5 to 15 carbon atoms. More preferably, R is a decylamino group.

As one example, the boronic hydrate inhibitor is a compound having the following structure:

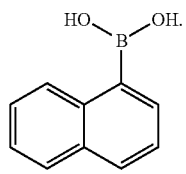 [SMILES: OB(O)c1cccc2ccccc12]

As another example, the boronic hydrate inhibitor is a compound having the following structure:

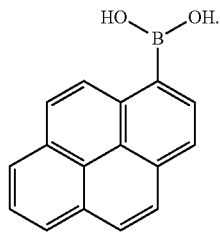 [SMILES: OB(O)c1ccc2ccc3cccc4ccc1c2c34]

As a further example, the boronic hydrate inhibitor is a compound having the following structure:

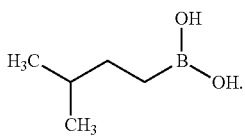

As yet another example, the boronic hydrate inhibitor is a compound having the following structure:

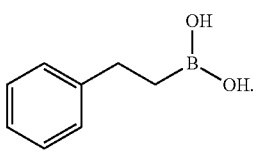 [SMILES: OB(O)CCc1ccccc1]

As still another example, the boronic hydrate inhibitor is a compound having the following structure:

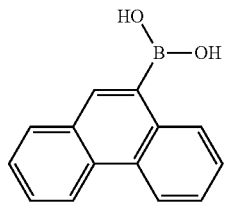

In another embodiment, the boronic hydrate inhibitor is naphthalene-1-boronic acid, naphthalene-2-boronic acid, naphthalene-3-boronic acid, or naphthalene-4-boronic acid.

In a further embodiment, the boronic hydrate inhibitor is pyrene-1-boronic acid, pyrene-2-boronic acid, pyrene-3-boronic acid, or pyrene-4-boronic acid.

In yet another embodiment, the boronic hydrate inhibitor is methyl butyl boronic acid.

In still another embodiment, the boronic hydrate inhibitor is (2-phenylethyl) boronic acid or 9-phenanthracenylboronic acid.

In a preferred embodiment, the present disclosure provides a hydrate inhibitor composition comprising a boronic hydrate inhibitor and a carrier fluid.

In this embodiment, the boronic hydrate inhibitor is selected from a boronic hydrate inhibitor discussed above. The boronic hydrate inhibitor is preferably present in the hydrate inhibitor composition in an amount in the range of from 20 wt. % to 90 wt. %. More preferably, the boronic hydrate inhibitor is present in the hydrate inhibitor composition in an amount in the range of from 50 wt. % to 70 wt. %.

The carrier fluid may comprise water, methanol, glycol, glycol ethers, toluene, naphtha, a terpene, or a combination thereof. Preferably, the carrier fluid is present in the hydrate inhibitor composition in an amount in the range of from 10 wt. % to 80 wt. %. More preferably, the carrier fluid is present in the hydrate inhibitor composition in an amount in the range of from 30 wt. % to 50 wt. %.

The hydrate inhibitor composition may additionally comprise any additive described in U.S. Pat. Nos. 8,814,473, 8,778,052, 7,696,393, 5,076,364, 5,879,561, 5,460,728, 5,648,575, and 6,905,605. Examples of such additives include corrosion inhibitors, wax inhibitors, asphaltene inhibitors, conventional hydrate inhibiters, and solvents.

Preferably, the hydrate inhibitor composition has a pH in the range form from 5 to 8. More preferably, the hydrate inhibitor composition has a natural pH or a near neutral pH.

In another embodiment, the present invention provides a method comprising: providing a hydrate inhibitor composition comprising a boronic hydrate inhibitor and injecting the hydrate inhibitor composition into a well or pipeline.

In this embodiment, the hydrate inhibitor composition is selected from a hydrate inhibitor composition discussed above.

The well or pipeline may be a subsea well or pipeline. The well or pipeline contains a flowable mixture of fluid capable of forming gas hydrates when exposed to certain flow conditions. Examples of flow conditions include pressures in the range of from 100 psig to 20,000 psig and temperatures in the range of from 25° F. to 40° F., a pressure in the range of from 500 psig to 20,000 psig and a temperature in the range of from 25° F. to 40° F., and a pressure in the range of from 500 psig to 20,000 psig and a temperature in the range of from 32° F. to 35° F.

Preferably, the flowable mixture comprises water, liquid hydrocarbon, and gas. Water may be present in the flowable mixture at a concentration in the range of from 1 vol. % to 95 vol. %.

In some embodiments, the water also comprises a brine.

Examples of the liquid hydrocarbon include crude oil or gas condensate.

The gas is selected from the group consisting of: methane, ethane, ethylene, acetylene, propane, propylene, methyl acetylene, n-butane, isobutane, 1-butene, trans-2-butene, cis-2-butene, isobutene, butane mixtures, isopentane, pentenes, natural gas, carbon dioxide, hydrogen sulfide, nitrogen, hydrogen, oxygen, argon, krypton, xenon, and any combination thereof.

The flowable mixtures may comprise gas hydrates.

The hydrate inhibitor composition is injected into the well or pipeline by any conventional means. The hydrate inhibitor composition may be injected into the well or pipeline when the well or pipeline is in a shut-in condition. Alternatively, the hydrate inhibitor composition may be injected into the well or pipeline while the well or pipeline is in a flowing condition.

The amount of hydrate inhibitor composition injected into the well or pipeline is dependent on the composition of the flowable mixture. For example, the amount of hydrate inhibitor composition injected into the well or pipeline may be an amount sufficient to form a flowable mixture in the well or pipeline comprising water, liquid hydrocarbon, gas, and hydrate inhibitor with a hydrate inhibitor concentration in the range of from 0.1 wt. % to 7.5 wt. % based on the water content of the flowable mixture. Preferably, the amount of hydrate inhibitor composition injected into the well or pipeline may be an amount sufficient to form a flowable mixture in the well or pipeline comprising water, liquid hydrocarbon, gas, and hydrate inhibitor with a hydrate inhibitor concentration in the range of from 1 wt. % to 5 wt. % based on the water content of the flowable mixture.

The amount of hydrate inhibitor composition injected into the well or pipeline is preferably in an amount sufficient to prevent the formation of agglomerations of hydrates, an amount sufficient to prevent the hydrate crystal growth, and/or an amount sufficient to disperse a hydrate deposit.

The method may further comprise allowing the boronic hydrate inhibitor to prevent the formation of an agglomeration of hydrate crystals, to prevent the formation of hydrate crystals, and/or to disperse a hydrate deposit.

In a preferred embodiment, the method further comprises recovering the boronic hydrate inhibitor.

Without wishing to be limited to theory, it is believed that the boronic hydrate inhibitors described herein function by creating fine (millimeter to micron size) hydrophobic gas hydrate particles that do not adhere to one another or the exposed surfaces of conduits. It is also believed that the boronic hydrate inhibitors described herein are capable of positioning themselves at or in close proximity to the water-hydrocarbon interface thus hindering hydrate crystal growth. It is also believed that the boronic hydrate inhibitors described herein prevent hydrate crystal growth by impeding access of water molecules with the hydrate crystal, rendering the surface of the hydrate crystal more hydrophobic and less hydrophilic. It is also believed that the boronic hydrate inhibitors described herein impact hydrate crystal growth by imposing structural weakness in the hydrate crystal. It is also believed that the boronic hydrate inhibitors described herein may preferably concentrate or partition into the hydrocarbon phase in a manner as to reduce the amount of the subject molecule within a water phase.

To facilitate a better understanding of the present invention, the following examples of certain aspects of some embodiments are given. In no way should the following examples be read to limit, or define, the scope of the invention.

EXAMPLES

Example 1

The ability of methyl butyl boronic acid to prevent hydrate formation was tested by micromechanical force measurements (MMF) and high-pressure autoclave trials. In the MMF measurements, the cohesive force between hydrate particles was directly measured as a function of the hydrate inhibitor concentration.

The test showed that methyl butyl boronic acid was extremely hydrate-philic, and was able to reduce the hydrate-oil interfacial tension below the threshold established for the current generation of industrial hydrate AA. It was also shown that the methyl butyl boronic acid interacted weakly with the water-oil interface, reducing the water-oil interfacial tension by only 25% at the highest surfactant concentration tested. This result suggests that the boronic acid surfactant would not function to enhance the stability of water-in-oil emulsions.

Example 2

The ability of pyrene-1-boronic acid and methyl butyl boronic acid to function as effective hydrate inhibitors was evaluated in a high-pressure, high-shear environment. Water, pyrene-1-bornic acid, and a liquid hydrocarbon phase were loaded into a first sapphire cell at approximately 20% liquid loading. Water, methyl butyl boronic acid, and a liquid hydrocarbon phase were loaded into a second sapphire cell at approximately 20% liquid loading. Each of the cells were then charged with methane gas to a desired pressure.

The fluids in each cell were then mixed with a magnetically-coupled vane-and-baffle geometry impeller, where the motor torque was monitored. Fluid temperature and pressure were measured during the test. When dosed at comparable concentrations to the current industry anti agglomerates, both the methyl butyl boronic acid and the pyrene-1-boronic acid produced torque signals at 30 vol % hydrate that were comparable to or less than the current generation of industry anti agglomerates, indicating that these surfactants perform well in both quiescent and high-shear environments.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

That which is claimed is:

1. A method comprising:
   providing a hydrate inhibitor composition comprising a boronic hydrate inhibitor and a carrier fluid;
   injecting the hydrate inhibitor composition into a well or pipeline in an amount sufficient to prevent formation of agglomerates of hydrates, wherein the boronic hydrate inhibitor has the following chemical structure:

(5)

wherein R is selected from the group consisting of an alkyl chain, an arene group, an aryl chain, an arylalkyl chain, an alkylaryl chain, a polycyclic aromatic group, a polycyclic group, and an aromatic group; and preventing formation of agglomerates of hydrates in the well or pipeline.

2. The method of claim 1, wherein the well or pipeline is a subsea well or pipeline.

3. The method of claim 1, wherein the carrier fluid is selected from the group consisting of water, methanol, glycol, glycol ethers, toluene, naphtha, a terpene, and combinations thereof.

4. The method of claim 1, wherein the boronic hydrate inhibitor comprises naphthalene-1-boronic acid.

5. The method of claim 1, wherein the boronic hydrate inhibitor comprises pyrene-1-boronic acid.

6. The method of claim 1, wherein the boronic hydrate inhibitor comprises methyl butyl boronic acid.

7. The method of claim 1, wherein the boronic hydrate inhibitor comprises (2-phenylethyl) boronic acid.

8. The method of claim 1, wherein the hydrate inhibitor is present in the boronic hydrate inhibitor composition in an amount in the range of from 20 wt. % to 90 wt. %.

* * * * *